United States Patent
Sinnarajah et al.

(10) Patent No.: US 8,072,922 B2
(45) Date of Patent: Dec. 6, 2011

(54) METHOD AND APPARATUS FOR NEGOTIATING PERSONALITIES IN A WIRELESS COMMUNICATIONS SYSTEM

(75) Inventors: Ragulan Sinnarajah, Markham (CA);
Fatih Ulupinar, San Diego, CA (US);
Gavin Bernard Horn, La Jolla, CA (US); Parag Arun Agashe, San Diego, CA (US); Paul E. Bender, San Diego, CA (US); Ravindra Patwardhan, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1162 days.

(21) Appl. No.: 11/830,764

(22) Filed: Jul. 30, 2007

(65) Prior Publication Data

US 2008/0056168 A1 Mar. 6, 2008

Related U.S. Application Data

(60) Provisional application No. 60/834,636, filed on Jul. 31, 2006, provisional application No. 60/835,294, filed on Aug. 2, 2006.

(51) Int. Cl.
*H04W 4/00* (2009.01)
(52) U.S. Cl. .................................................... 370/328
(58) Field of Classification Search .................. 370/310, 370/310.2, 312, 320, 328, 335, 342, 469, 370/465, 329, 340, 341, 337, 347, 349, 412, 370/471, 395.5, 395.71
See application file for complete search history.

(56) References Cited

U.S. PATENT DOCUMENTS

| | | | |
|---|---|---|---|
| 5,267,244 A | 11/1993 | Messerschmitt et al. | |
| 6,847,992 B1 * | 1/2005 | Haitsuka et al. | 709/218 |
| 7,106,779 B2 * | 9/2006 | Bender et al. | 375/130 |
| 7,158,537 B2 | 1/2007 | Bender et al. | |
| 7,647,349 B2 * | 1/2010 | Hubert et al. | 707/999.107 |
| 2003/0133494 A1 | 7/2003 | Bender et al. | |

FOREIGN PATENT DOCUMENTS

| | | |
|---|---|---|
| EP | 0532102 | 3/1993 |
| RU | 2159990 | 11/2000 |

OTHER PUBLICATIONS

Written Opinion—PCT/US07/074896, International Search Authority—European Patent Office—Jan. 2, 2008.

(Continued)

*Primary Examiner* — Chi Pham
*Assistant Examiner* — Alexander Boakye
(74) *Attorney, Agent, or Firm* — Francois Pelaez; Darren M. Simon

(57) ABSTRACT

A method and apparatus are disclosed for negotiating and managing one or more personalities in a wireless communications system. The method comprises advertising one or more supported initial protocol set identifiers. Furthermore, the method comprises selecting a starting initial protocol set identifier from the advertised initial protocol set identifiers. In addition, the method comprises establishing a session based on the selected starting initial protocol set identifier. The method also comprises establishing a connection between an access terminal and an access network based on the selected initial protocol set identifier.

60 Claims, 15 Drawing Sheets

OTHER PUBLICATIONS

"UHDR-One: Session Layer Design" Internet Article, (Online) Jun. 2006, pp. 1-11, XP002462296 Retrieved from the Internet: URL:http://www.3gcn.org/3gpp2/TSGC/Working/2006/2006-06-MiyazakiJapan/TSG-C-2006-06-Miyazaki%20-%20Japan/WG2/C20-20060626-019(UHDR-One-SessionLayer).pdf> (retrieved on Dec. 13, 2007) p. 1-p. 11.

"Cdma2000 High Rate Packet Data Air Interface Specification" Internet Article, (Online) Apr. 2006, pp. 7.1-7.75, 14.6-14.7, XP002462297 3GPP2 C.S0024-B.

"UHDR-One: Connection Layer Design" Internet Artivle, (Online) Jun. 2006, pp. 1-35, XP002462298 Retrieved from the Internet: URL:http://www.3gcn.org/3gpp2/TSGC/Working/2006/2006-06-MiyazakiJapan/TSG-C-2006-06-Miyazaki%20-%20Japan/WG2/C20-20060626-018R1(UHDR-One-ConnectionLayer). pdf> (retrieved on Dec. 13, 2007) p. 32.

"UHDR-One: Session Layer Design" Internet Article, (Online) Jul. 2006, pp. 1-23, XP002462299 Retrieved from the Internet: URL:http://www.3gcn.org/3gpp2/TSGC/Working/2006/2006-06-MiyazakiJapan/TSG-C-2006-06-Miyazaki%20-%20Japan/WG2/C20-20060626-019(UHDR-One-SessionLayer).pdf> (retrieved on Dec. 13, 2007) p. 1-p. 23.

International Search Report—PCT/US07/074896, International Search Authority—European Patent Office—Jan. 2, 2008.

Homburg, Philip An Object Model for Flexible Distributed Systems) Vrije Universiteit Amsterdam, Mar. 29, 1995.

Nenning Schulzrinne, Jonathan Rosenberg: "The Session Initiation Protocol: Internet-Centric Signaling" IEEE Communications Magazine, 'Online! Oct. 2000, pp. 134-141, XP002352523.

* cited by examiner

*ConfigurationStart Message*

*ConfigurationRequest Message*

*ConfigurationResponse Message*

*ConfigurationComplete Message*

*ConfigurationReject Message*

*SessionUpdated Message*

*SwitchPersonality Message*

*SwitchPersonalityAccept Message*

*SwitchPersonalityReject Message*

*SwitchPersonalityRequest Message*

*DeletePersonalityRequest Message*

*DeletePersonality Message*

METHOD AND APPARATUS FOR NEGOTIATING PERSONALITIES IN A WIRELESS COMMUNICATIONS SYSTEM

CROSS-REFERENCE TO RELATED APPLICATIONS

The present application for patent claims the benefit of the following U.S. Provisional Patent Applications: (1) U.S. Provisional Application Ser. No. 60/834,636, filed on Jul. 31, 2006, entitled "UHDR-ONE: SESSION LAYER", which is incorporated herein by reference; and (2) U.S. Provisional Application Ser. No. 60/835,294, filed on Aug. 2, 2006, entitled "UHDR-ONE: SESSION LAYER", which is incorporated herein by reference.

FIELD

This disclosure relates generally to a method and apparatus for negotiating and managing personalities in a wireless communications system.

BACKGROUND

In a typical wireless communications system utilizing the 3GPP or 3GPP2 protocol standards, a network access terminal (AT) connected to a network (AN) routinely requires a change to its existing state. To accomplish such a change in the AT, the AT and the AN must communicate with each other. In particular, a protocol process of the AT known as the Session Configuration Protocol (SCP)—a protocol process responsible for coordinating and managing the configuration of other protocol processes—must communicate with its corresponding peer on the AN. Likewise, other non-SCP protocol processes of the AT requiring change must communicate with their corresponding peer on the AN.

Therefore, there is a needed for a method which defines a standard by which an AT requiring configuration change coordinates its protocol processes to relay its need to change the existing configuration status of one or more of its protocol processes to the AN. The method should also define a standard by which the SCP of the AT informs the protocol process requiring a change in its status that it is allowed to execute the change.

SUMMARY

A method and apparatus are disclosed for negotiating and managing one or more personalities in a wireless communications system. The method comprises advertising one or more supported initial protocol set identifiers. Furthermore, the method comprises selecting a starting initial protocol set identifier from the advertised initial protocol set identifiers. In addition, the method comprises establishing a session based on the selected starting initial protocol set identifier. The method also comprises establishing a connection between an access terminal and an access network based on the selected initial protocol set identifier.

DETAILED DESCRIPTION

I. Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP2 UMB (Ultra Mobile Broadband), WiMax, or some other modulation techniques.

A system may be designed to support one or more standards such as the standard offered by a consortium named "3rd Generation Partnership Project 2" referred to herein as 3GPP2, including Document Nos. C.S0024 ("cdma2000 High Rate Packet Data Air Interface Specification"), and C.P0084 ("Session Control Plan for Ultra Mobile Broadband (UMB) Air Interface Specification"). The standards and documents cited above are hereby expressly incorporated herein by reference.

Figure 1:
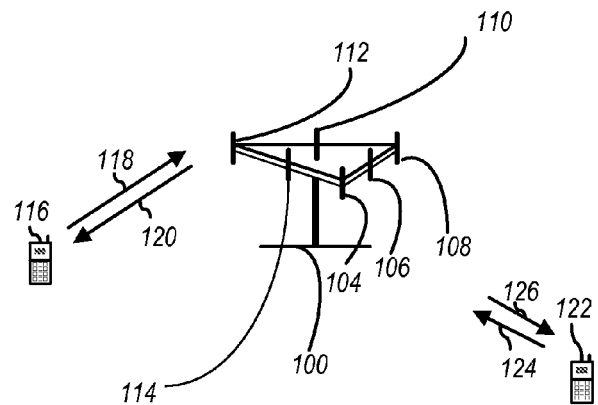
FIG. 1 shows a multiple access wireless communication system according to one embodiment of the invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 utilize beamforming in order to improve the signal-to-noise ratio of forward links for the different access terminals 116 and 124. Also, an access network using beamforming to transmit to access terminals scattered randomly through its coverage causes less interference to access terminals in neighboring cells than an access network transmitting through a single antenna to all its access terminals.

An access network (AN) may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
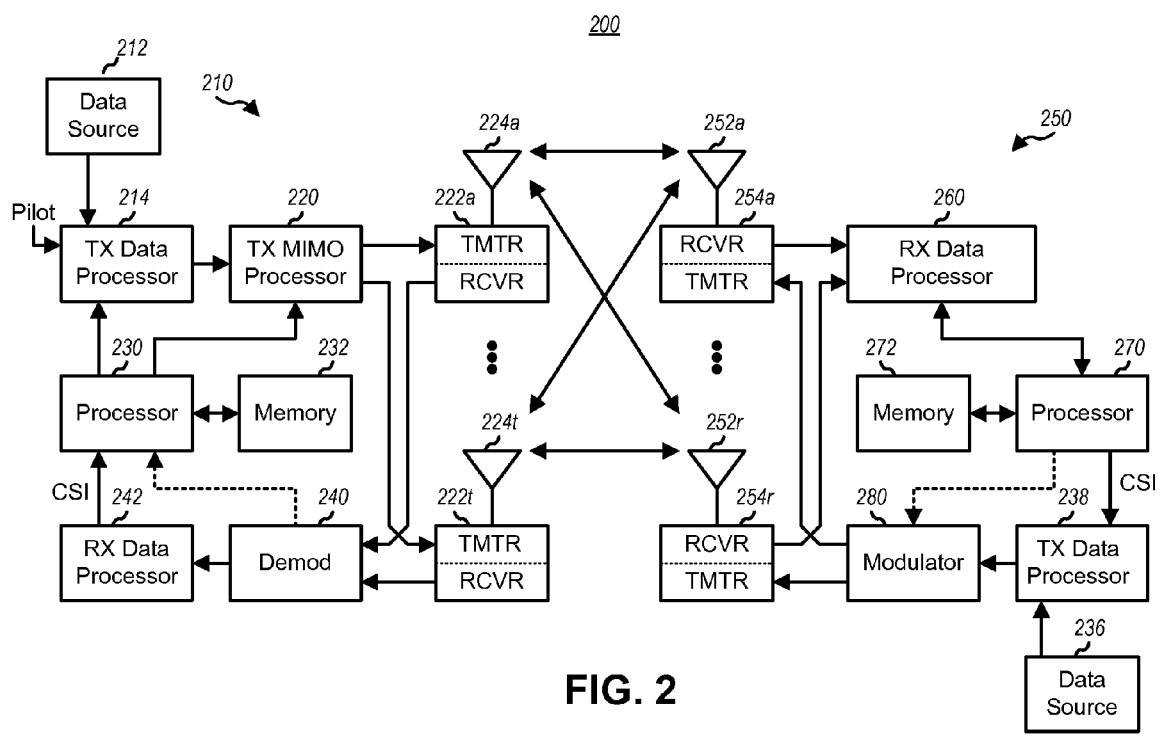
FIG. 2 is a block diagram of an embodiment of a transmitter system (also known as the access network) and a receiver system (also known as access terminal) in a MIMO system according to one embodiment of the invention.

FIG. 2 is a block diagram of an embodiment of a transmitter system 210 (also known as the access network) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In the following discussion, the invention will be described mainly in the context of the 3GPP2 architecture reference model. However, it is understood that with the disclosed information, one skilled in the art could easily adapt for use and implement aspects of the invention in a 3GPP network architecture as well as in other network architectures.

Architecture Reference Model

Figure 3A:
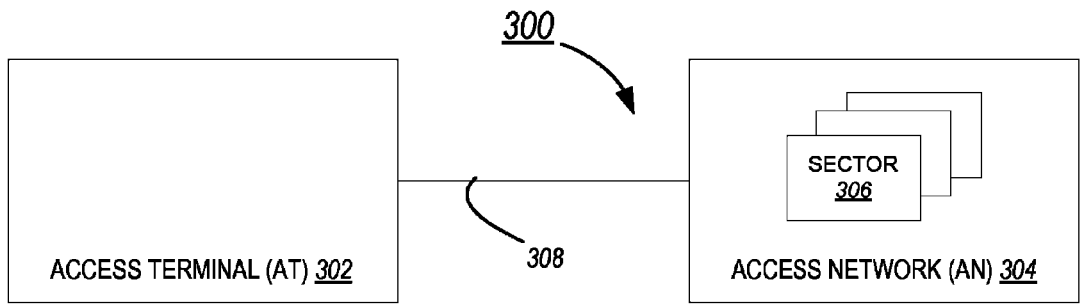
FIGS. 3A, 3B, and 3C show a reference model for a 3GPP2 implementation according to one embodiment of the invention.
Figure 3B:
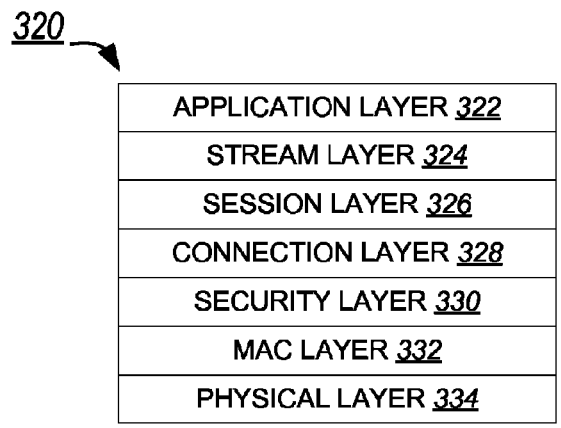
Figure 3C:
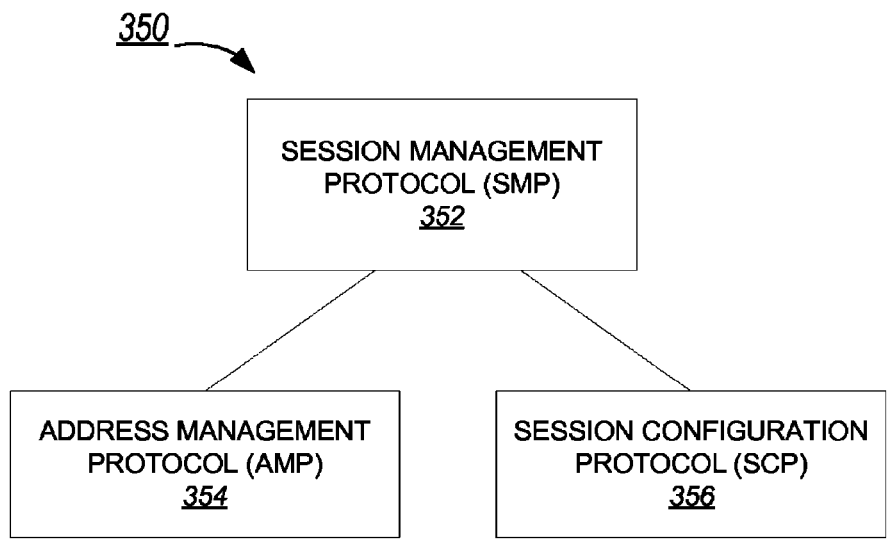

FIGS. 3A, 3B, and 3C show a reference model for a 3GPP2 implementation. As shown in FIG. 3A, the reference model 300 includes the air interface 308 between the access terminal (AT) 302 and the access network (AN) 304 which includes one or more sectors 306.

FIG. 3B illustrates an exemplary layered architecture 320 of the air interface 308 (shown in FIG. 3A). In one embodiment, the architecture 320 includes seven layers as follows:

1) Application Layer—The Application Layer 322 provides one or more applications. In one embodiment, the Application Layer 322 provides the Default Signaling Application for transporting air interface protocol messages, and the Default Packet Application for transporting user data.
2) Stream Layer—The Stream Layer 324 enables multiplexing of distinct application streams.
3) Session Layer—The Session Layer 326 provides address management, protocol negotiation, protocol configuration, and state maintenance services.
4) Connection Layer—The Connection Layer 328 provides air link connection establishment and maintenance services.
5) Security Layer—The Security Layer 330 provides authentication and encryption services.
6) Medium Access Control (MAC) Layer—The MAC Layer 332 defines the procedures used to receive and to transmit over the Physical Layer.
7) Physical Layer—The Physical Layer 334 provides the channel structure, frequency, power output, modulation, and encoding specifications for the forward and reverse channels.

Each of the above seven layers may contain one or more protocols. These protocols use signaling messages or headers to convey information to their peer entities at the other side of the air link. In one embodiment, the Signaling Network Protocol (SNP) is used to transmit the messages or headers.

Referring now to FIG. 3C shows an exemplary structure 350 of Session Layer. As shown, the Session Layer 350 comprises the Session Management Protocol (SMP) 352, the Address Management Protocol (AMP) 354, and the Session Configuration Protocol (SCP) 356.

The Session Layer is generally responsible for managing the sessions between cooperating applications that are transferring data to each other. SMP 352 is responsible for managing the activation of the other Session Layer protocol processes (SCP and AMP) and the closure of the session. AMP 354 is responsible for maintaining address information. SCP 356 is responsible for handling protocol subtypes and maintaining the status of the current session, status during initiation, and coordination of answering protocol processes during configuration.

Implementing Personalities

In one aspect, the present invention provides modifications and augmentations to the Session Layer to enable the application and management (such as creating, switching, and deleting) of personalities. In certain embodiments, a personality defines all protocol subtypes and associated attribute values that can be used for communication between AT and AN. Personalities may be created by AT or AN via Session Configuration Protocol (SCP) negotiation. Personalities may be stored at the Session Storage Point (SSP). Personalities may be identified by an 8-bit Personality ID. Each AN in an active set may use a different personality to communicate with AT. This is the InUse personality (or the personality currently being used between AT and AN). The InUse personality of an access network (AN) may map to a stored personality at the SSP. AT may have all personalities stored at SSP.

In one embodiment, there are four types of data and/or attributes processed by the Session Layer, including: static data (such as a Session Key), static attributes (such as the maximum number of personalities that can be supported), "soft-committable" dynamic attributes (or attributes that can be effectively changed without having to close the connection), and "hard-committable" dynamic attributes (attributes that may require a closing of the connection for changes to take effect). Both AT and AN can modify each of these four types of data and/or attributes.

In one embodiment, static data and static attributes are properties of the protocol type, while dynamic attributes are properties of the protocol subtype. In this embodiment, when a value of a static data or a static attribute is changed in one personality, the change is applied to all personalities. In addition, the static data and static attributes are soft-committable. In contrast, when the value of a dynamic attribute is changed in a personality, the change applies only that personality.

Figure 4:
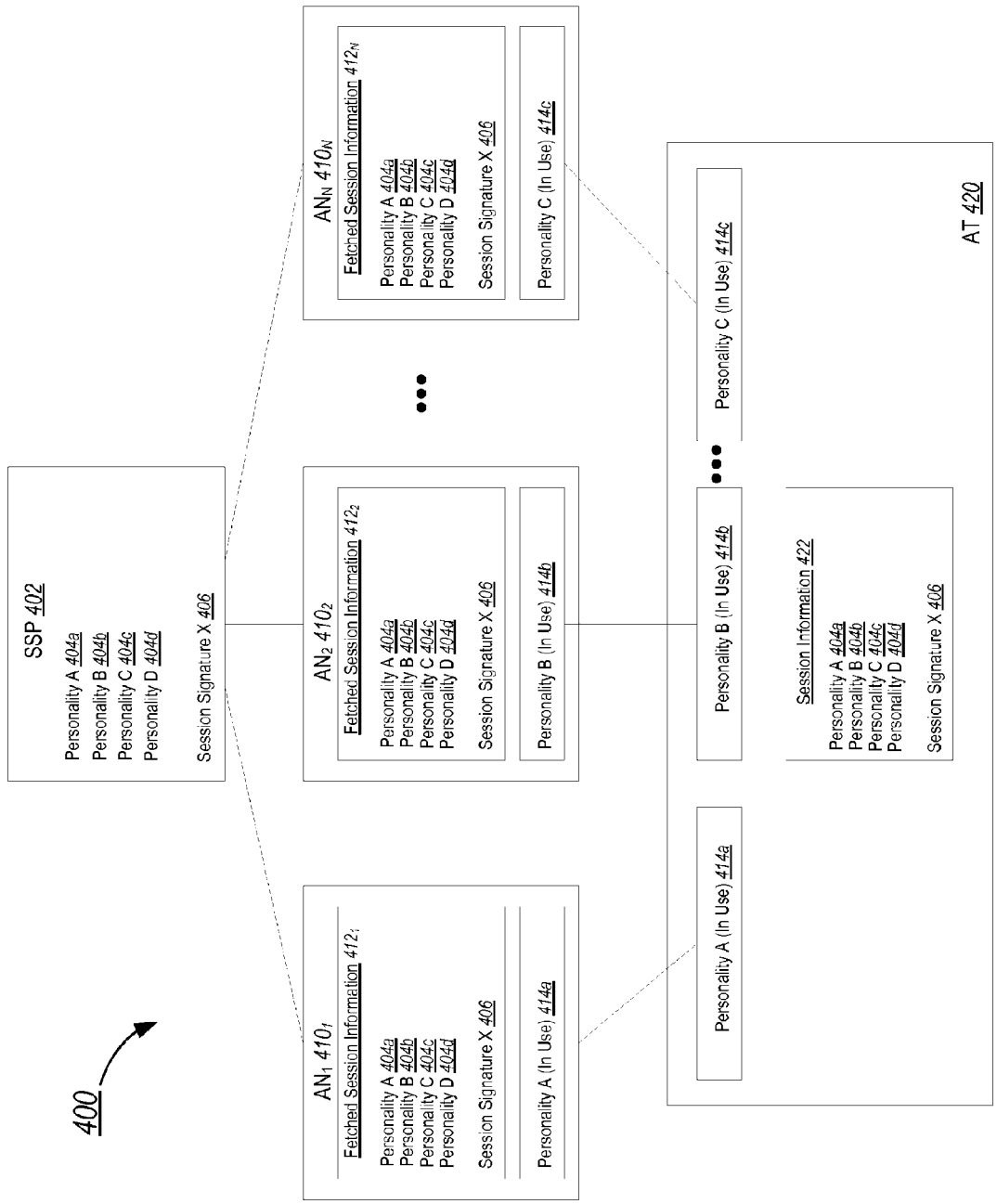
FIG. 4 illustrates an exemplary wireless communications network in which personalities are implemented according to one embodiment of the invention.

FIG. 4 illustrates an exemplary wireless communications network 400 in which personalities are implemented in accordance with one embodiment of the invention. As shown, the network 400 includes an SSP (Session Storage Point) 402, an AT 420, and several Access Networks (AN) $410_1, 410_2, \ldots, 410_N$. SSP 402 stores personalities 404a-404d created in the network 400. However, SSP 402 does not maintain any state information. For example, SSP 402 does not know which personalities are currently InUse. AN $410_1, 410_2, \ldots, 410_N$ can create and re-configure personalities 404a-404d, request a switch of its InUse personality, or request for deletion of personalities 404a-404d. AT 420 can also create and re-configure personalities 404a-404d, and can suggest a switch of the InUse personality of an AN $410_1, 410_2, \ldots, 410_N$. Furthermore, AT 420 keeps track of the InUse personality 414a-414d of each AN in an active set. As described above, each AN $410_1, 410_2, \ldots, 410_N$ in an active set may use a different personality to communicate with AT 420. This personality is the InUse personality (or the personality currently being used between AT and AN). AT 420 determines and controls how many distinct InUse personalities it would support.

III.A Setting Up an Initial Session

Figure 5:
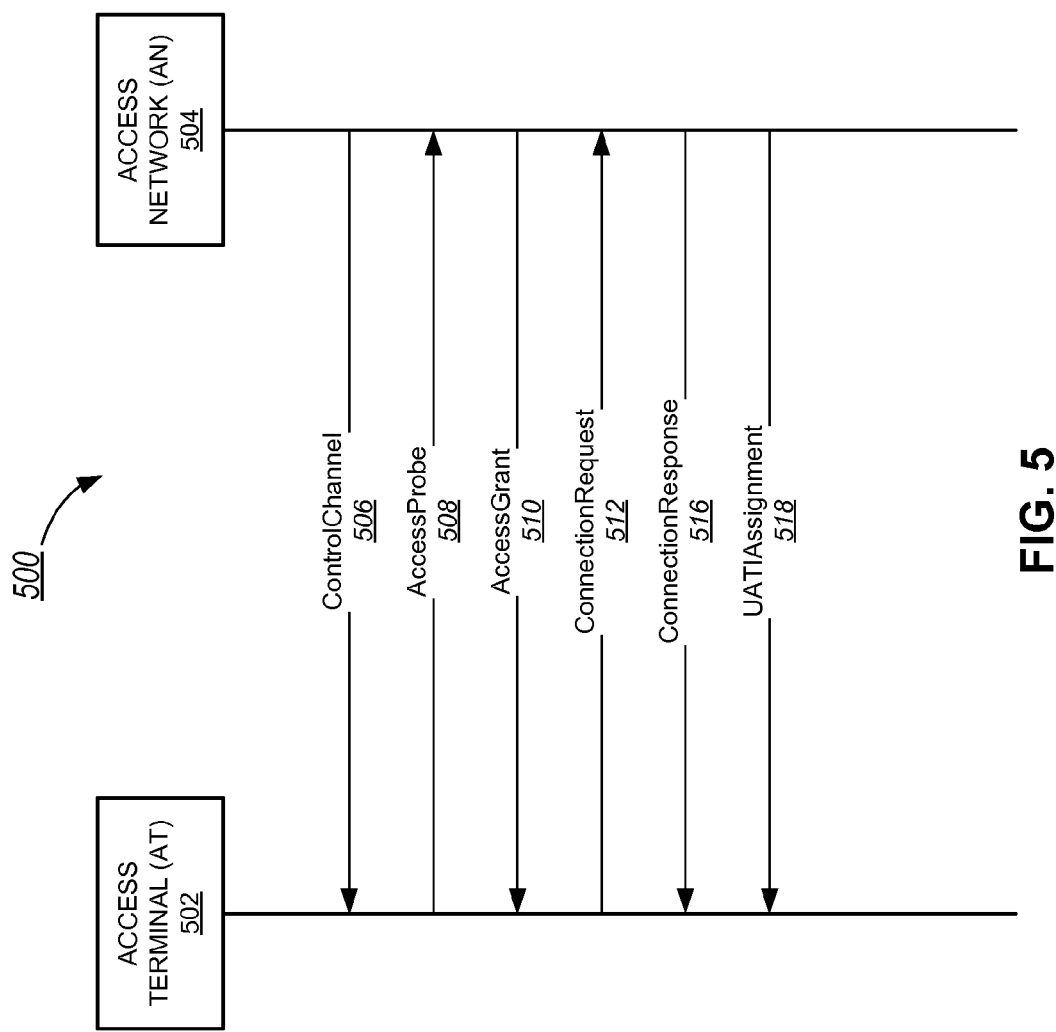
FIG. 5 outlines an exemplary call flow for an initial session setup according to one embodiment of the invention.

FIG. 5 outlines an exemplary call flow 500 for an initial session setup. In one embodiment, AN 504 advertises (via step 506) supported IPSIs (Initial Protocol Set Identifier), which is general a set of protocol subtypes that can be used for initial communication between AT 502 and AN 504. AT 502 selects the initial ISPI ($ISPI_i$), creates the protocol stack per the selected $ISPI_i$, and requests for a connection (step 512) based on the selected $ISPI_i$. A session would be opened with subtypes and default attributes corresponding to the selected $ISPI_i$.

In one embodiment, when a "connection request" message (step 512) is sent with the selected $ISPI_i$, a Personality ID of '0' is assumed. In this embodiment, the Personality ID of '0' is reserved for the stack of an IPSI-based personality. As such, no other personality can be stored as the Personality ID of '0'. In addition, a personality switch into the Personality ID of '0' cannot be performed.

III.B Setting Up a Connection

Figure 6:
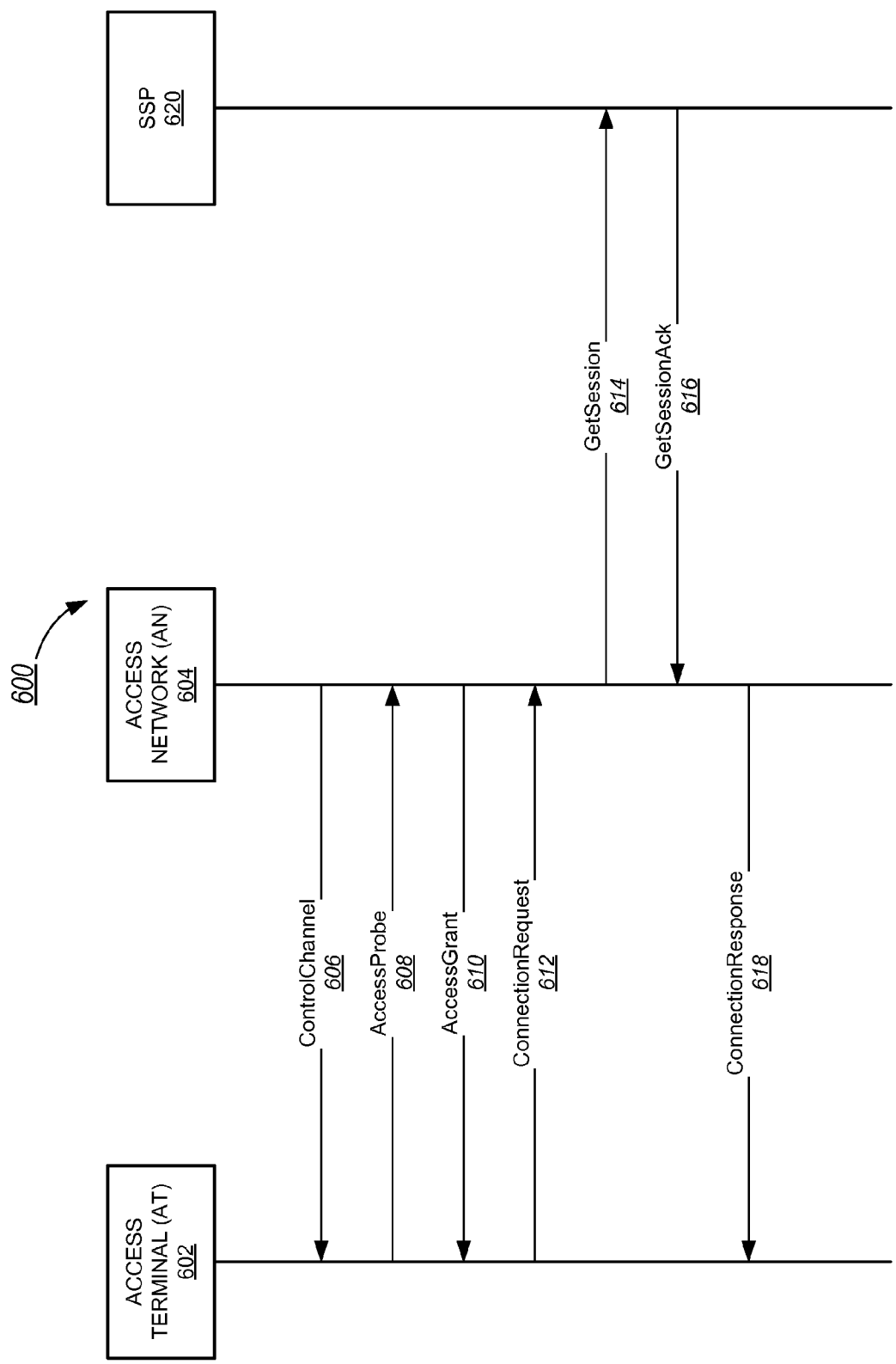
FIG. 6 illustrates an exemplary call flow to set up a connection according to one embodiment of the invention.

FIG. 6 illustrates an exemplary call flow 600 to set up a connection once a session has been opened or established. In one embodiment, AN 604 advertises (via step 606) supported IPSIs. At this point in time, AT 602 is in an idle state, and has a session established (or opened) with a particular unicast access terminal identifier ($UATI_i$). AT 602 proceeds to select a personality (personality X) that matches one of the advertised IPSIs. In this embodiment, if AT 602 wants to set up a connection using an existing personality X and advertised IPSI, AT 602 would send a "connection request" message (step 612) to AN 604 with UATI$_i$, the ID of personality X, and the advertised IPSI as parameters (or fields) of the message. Upon receiving the "connection request" message (step 612), AN 604 sends a "get session" message (step 614) to query SSP 620. In response, SSP 620 would send a "get session" acknowledgement (step 616) to AN 604. If AN 604 chooses to accept personality X, AN 604 would send a "connection response" message (step 618) to do so. Once AN 604 accepts personality X, this personality becomes the InUse personality between AT 602 and AN 604. However, AN 604 could choose to reject personality X, and negotiate with AT 602 to adopt a personality other than personality X.

III.C Adding Access Networks to the Active Set

Figure 7:
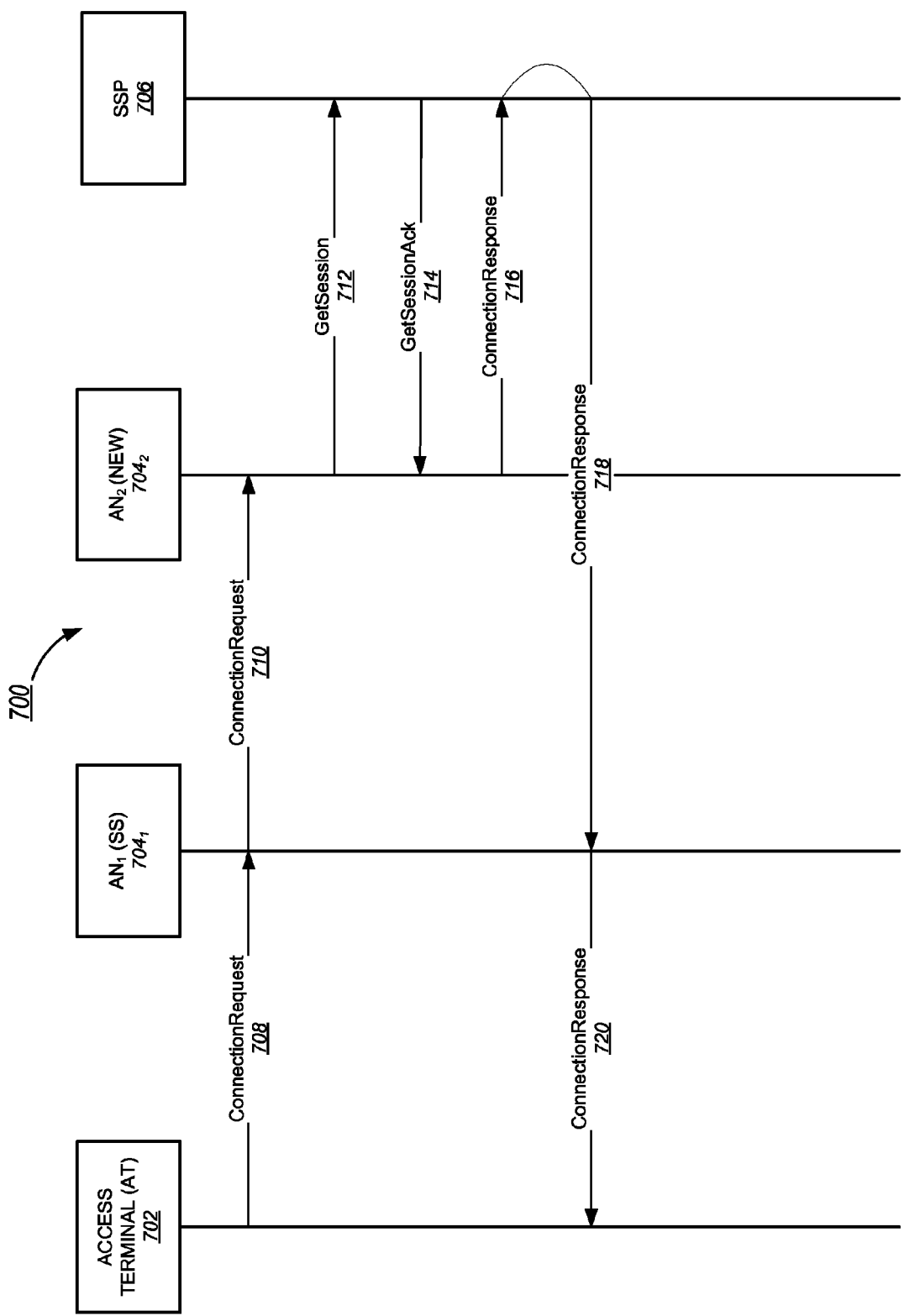
FIG. 7 is an exemplary call flow to add a new access network to the active set according to one embodiment of the invention.

FIG. 7 is an exemplary call flow 700 to add a new AN to the active set. An active set is generally a set of sectors that have reserved air interface resources for AT 702. AT 702 may add or remove sectors from the active set as AT 702 moves around the network. In the context of FIG. 7, AT 702 has an established session with UATI$_i$ as well as a connection with AN$_1$ 704$_1$. Furthermore, AN$_1$ 704$_1$ is the serving access network to facilitate communications with external links, and is denoted as AN$_1$ (SS). In addition, AT 702 has a connection established AN$_1$ 704$_1$ with personality X being the InUse personality. AT 702 wants to add to its active set a sector belonging to new AN$_2$ 704$_2$, and wants to establish a connection with the new AN$_2$ 704$_2$ using personality Y.

As shown in FIG. 7, AT 702 sends a "connection request" message (step 708) to serving AN$_1$ 704$_1$ to establish a connection with the new AN$_2$ 704$_2$. AT 702 would populate the "connection request" message with the identification (ID) of personality Y since this is the personality with which AT 702 wants to establish the connection. Acting as the serving AN, AN$_1$ 704$_1$ forwards the "connection request" message (step 710) to the new AN$_2$ 704$_2$. AN$_2$ 704$_2$ sends a "get session" message (step 712) to query SSP 706. In response, SSP 706 would send a "get session" acknowledgement (step 714) to AN$_2$ 704$_2$.

In one scenario, AN$_2$ 704$_2$ elects to reject personality Y and adopt personality Z instead. As such, AN$_2$ 704$_2$ issues a "connection response" message to SSP 706 and serving AN$_1$ 704$_1$ (steps 716 and 718) populated with personality Z. AN$_1$ 704$_1$ then forwards the "connection response" message (step 720) to AT 702. Upon receipt of the "connection response", AT 702 would delete the communication protocol stack related to personality Y, and creates a stack based on personality Z. At this point in time, AN$_2$ 704$_2$ is added to the active set, personality X is InUse between AT 702 and AN$_1$ 704$_1$, and personality Z is InUse between AT 702 and AN$_2$ 704$_2$.

In an alternative scenario, AN$_2$ 704$_2$ could choose to accept and adopt personality Y as the InUse personality with AT 702. If so, AN$_2$ 704$_2$ would issue a "connection response" message (steps 716 and 718) populated with personality Y.

III.D Creating or Re-Configuring Personalities

Figure 8:
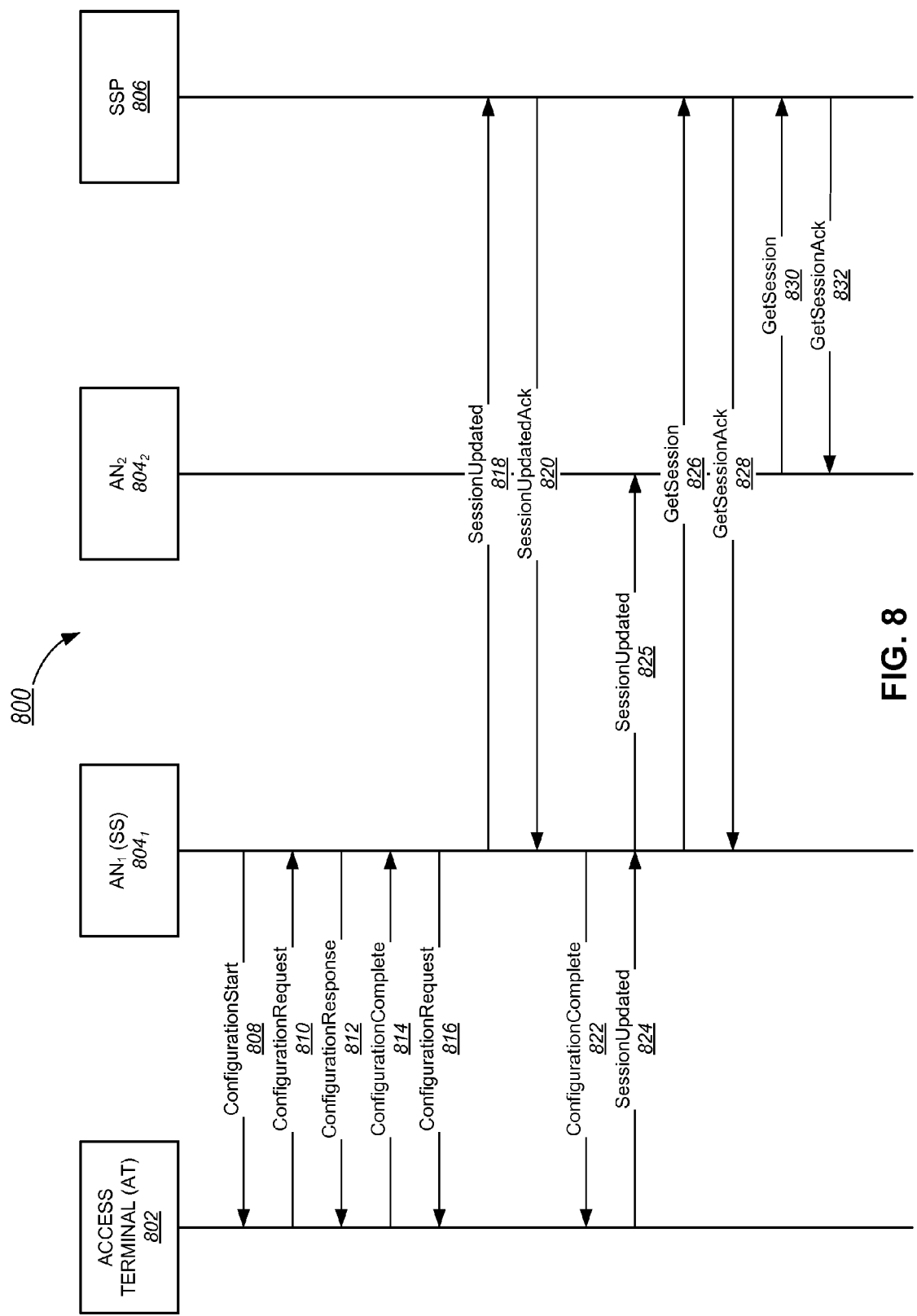
FIG. 8 is an exemplary call flow for an access network (AN) to initiate the creation or re-configuration of a personality according to one embodiment of the invention.

FIG. 8 is an exemplary call flow 800 for an access network (AN) to initiate the creation or re-configuration of a personality. In one embodiment, any AN in the active set can create new personalities or re-configure and existing personality. As a starting point, an IPSI or an existing personality could be selected and used. Furthermore, the selected existing personality could be the InUse personality of the AN that initiates the personality creation or re-configuration process, or of another AN.

The created personality can be stored in an existing personality bin (or Personality ID) as long as the differences (or delta) between the created or re-configured personality and the existing personality consists of only static data or static attributes. The selected personality bin could be the InUse personality of the access network (AN) initiating the creating or re-configuring process, or of another AN. However, the created or re-configured personality can be stored as a new personality at the discretion of the access network (AN). The access network (AN) would get to pick the value of the new Personality ID. However, that the Personality ID of '0' cannot be used as it is reserved for an IPSI-based stack.

Figure 11:
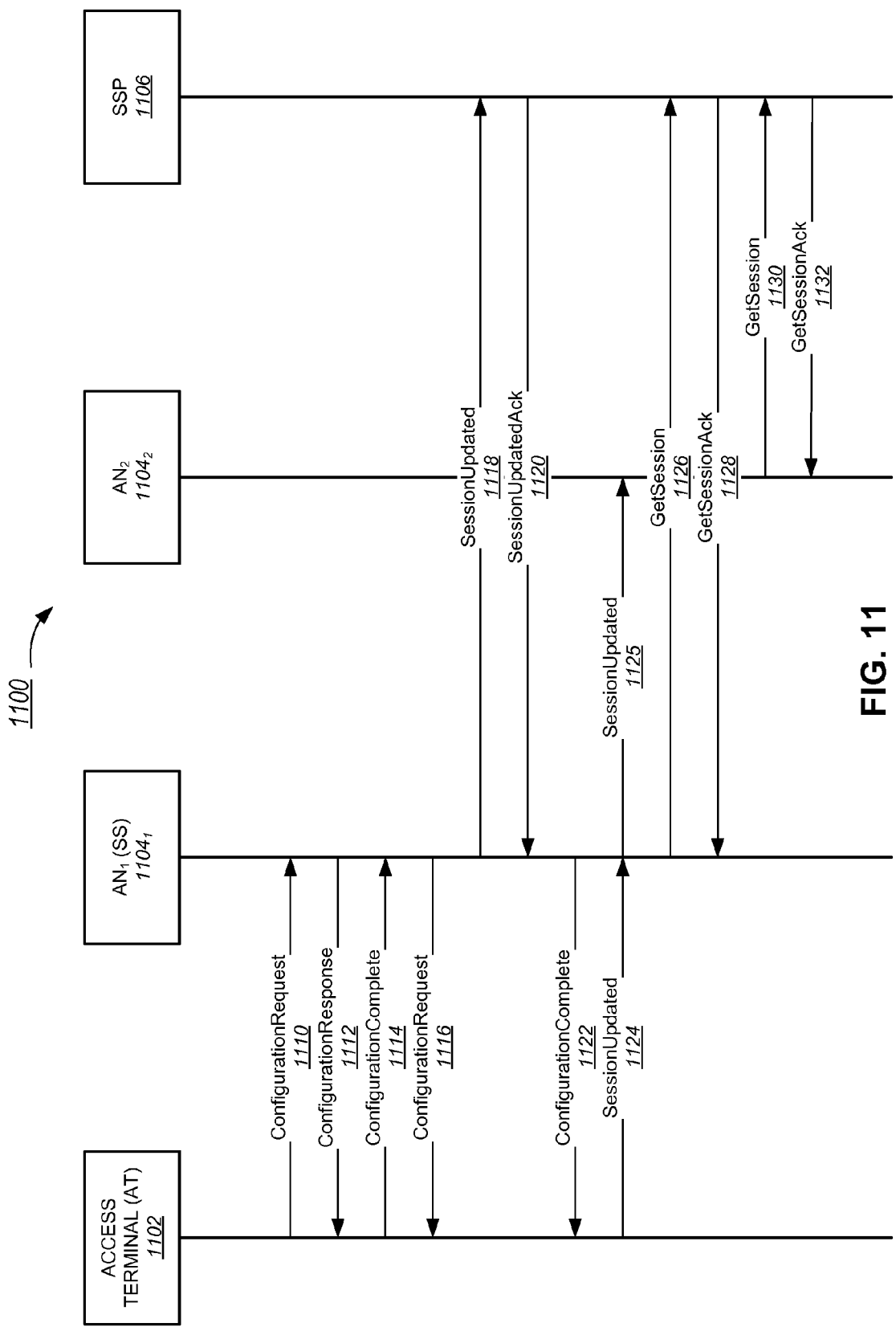
FIG. 11 is an exemplary call flow for an access terminal (AT) to initiate the creation or re-configuration of a personality according to one embodiment of the invention.

In addition, an access terminal (AT) can initiate the process of creating or re-configuring personalities. The description of this process is shown in FIG. 11 and is similar to the process of FIG. 8.

Figure 9A:
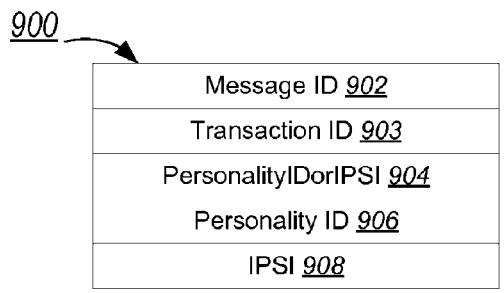
FIG. 9A illustrates an exemplary structure of a "configuration start" message according to one embodiment of the invention.

In the context of FIG. 8, AT has established a session, and is in connection with serving AN$_1$ 804$_1$ and AN$_2$ 804$_2$. Furthermore, AN$_1$ 804$_1$ wants to create a new personality based on a selected IPSI$_i$ or an existing personality X. AN$_1$ 804$_1$ sends a "configuration start" message (step 808) to AT 802 to start a session configuration process. FIG. 9A illustrates an exemplary structure of a "configuration start" message 900 in accordance with one embodiment of the invention. As shown in FIG. 9A, the "configuration start" message 900 includes the following fields:

Message ID—AN would set the Message ID field 902 to a unique value to indicate that the message is a "configuration start" message. In one embodiment, AN would set the field 902 to the value of 0x0e.

Transaction ID—AN would increment the value of the Transaction ID field 903 for each new "configuration start" message sent.

PersonalityIDorIPSI—This field 904 is used to indicate whether the starting configuration for the personality to be negotiated is a stored personality or an IPSI. In one embodiment, AN would set the PersonalityIDorIPSI field 904 to '1' if the starting configuration for the personality to be negotiated is a stored personality, and to '0' if the starting configuration for the personality to be negotiated is an Initial Protocol Set Identifier (IPSI).

Personality ID—AN would omit this field 906 if PersonalityIDorIPSI 904 indicates an IPSI selection (or '0' in one embodiment). Otherwise, AN would set this field 906 to the identification of the stored personality that is to be the starting configuration for the personality to be negotiated.

IPSI—AN would omit this field 908 if the PersonalityIDorIPSI field 904 indicates a stored personality selection (or '1' in one embodiment). Otherwise, AN would set this field 908 to the IPSI that is to be the starting configuration for the personality to be negotiated.

Figure 9B:
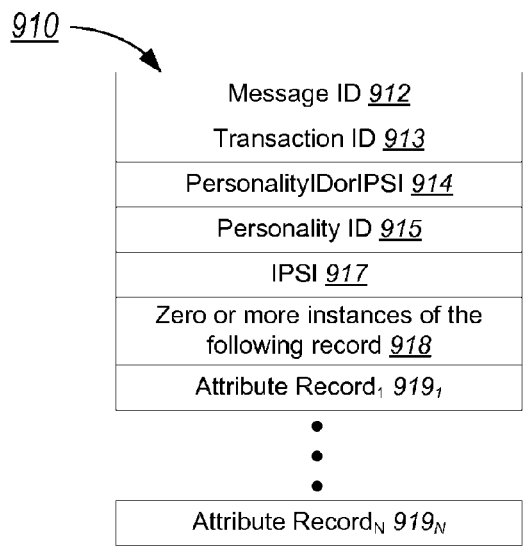
FIG. 9B shows an exemplary structure of a "configuration request" message according to one embodiment of the invention.

Returning to FIG. 8, AT 802 issues a "configuration request" message (step 810) to propose new values for attributes if it is available to participate in the personality creation or re-configuration process. FIG. 9B shows an exemplary structure of a "configuration request" message 910 in accordance with one embodiment of the invention. As shown in FIG. 9B, the "configuration request" message 910 includes the following fields:

Message ID—The sender of the "configuration request" message 912 could be AT or AN. Furthermore, the sender would set this Message ID field 912 to a unique value to indicate that the message is a "configuration request" message and that the sender is either AT or AN. In one embodiment, AT would set the field to the value of 0x00, while AN would set the field 912 to the value of 0x01.

Transaction ID—The sender of the "configuration request" message 900 would increment the value of this field 913 for each new "configuration request" message sent.

PersonalityIDorIPSI—This field 914 is used to indicate whether the starting configuration for the personality to be negotiated is a stored personality or an IPSI. In one embodiment, the sender would set the PersonalityIDorIPSI field 914 to '1' if the starting configuration for the personality to be negotiated is a stored personality, and to '0' if the starting configuration for the personality to be negotiated is an Initial Protocol Set Identifier (IPSI).

Personality ID—The sender would omit this field 915 if Personality ID or IPSI 914 indicates an IPSI selection (or '0' in one embodiment). Otherwise, the sender would set this field 915 to the identification of the stored personality that is to be the starting configuration for the personality to be negotiated.

IPSI—The sender would omit this field 917 if the Personality ID or IPSI field 1004 indicates a stored personality selection (or '1' in one embodiment). Otherwise, the sender would set this field 917 to the IPSI that is to be the starting configuration for the personality to be negotiated.

Zero or more instances of following Attribute Records— This field 918 is used to indicate the number (zero or more) of records of new attributes being proposed.

Attribute Records—The Attribute Records $919_1 \ldots 919_N$ contain proposed new values for one or more protocols. The number of attributes is provided in the field 918.

Figure 9C:
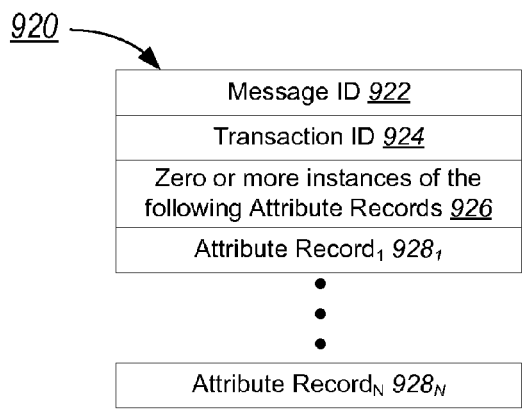
FIG. 9C illustrates an exemplary structure of a "configuration response" message according to one embodiment of the invention.
Figure 9D:
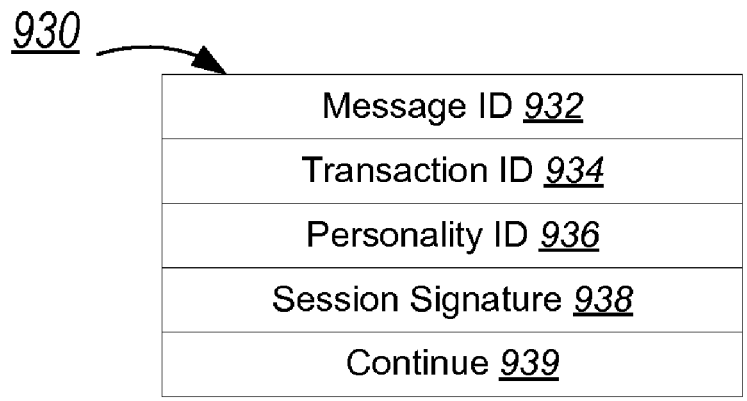
FIG. 9D is an exemplary structure of a "configuration complete" message according to one embodiment of the invention.
Figure 9E:
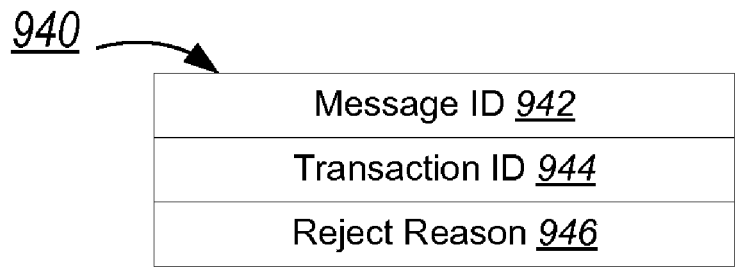
FIG. 9E shows an exemplary structure of a "configuration reject" message according to one embodiment of the invention.

Continuing with FIG. 8, AT 802 could issue a "configuration reject" message, instead of the "configuration request" message of step 810, in response to the "configuration start" message of step 808. AT 802 would do so if it is, for example, engaging in a configuration process with another AN. FIG. 9E shows an exemplary structure of a "configuration reject" message 940 in accordance with one embodiment of the invention. As shown in FIG. 9E, the "configuration reject" message 940 includes the following fields:

Message ID—The sender of the "configuration reject" message 940 would set this Message ID field 942 to a unique value to indicate that the message is a "configuration reject" message 940. In one embodiment, the sender would set the field 942 to the value of 0x0f.

Transaction ID—The sender of the "configuration reject" message 940 would set the value of this Transaction ID field 944 equals to the value of the Transaction ID field 903 of the corresponding "configuration start" message 900.

Reject Reason—The sender of the "configuration reject" message 940 would set this Reject Reason field 946 to indicate the reason the corresponding "configuration start" message 900 is being rejected.

Turning back to FIG. 8, assuming that AT 802 issues a "configuration request" message (step 810), $AN_1$ $804_1$ would send a "configuration response" message (step 812) to respond to the "configuration request" message. FIG. 9C illustrates an exemplary structure of a "configuration response" message 920 in accordance with one embodiment of the invention. As shown in FIG. 9C, the "configuration response" message 920 includes the following fields:

Message ID—The sender would set this Message ID field 922 to a unique value to indicate that the message is a "configuration response" message. In one embodiment, the sender would set the field 922 to the value of 0x02.

Transaction ID—The sender of the "configuration response" message would set the value of this Transaction ID field 924 equals to the value of the Transaction ID field 913 of the corresponding "configuration request" message 910.

Zero or more instances of following Attribute Records— This field 926 is used to indicate the number (zero or more) of records of new proposed attributes being accepted.

Attribute Records—The Attribute Records $928_1 \ldots 928_N$ contain accepted new proposed values for one or more protocols. The number of attributes is provided in the field 1112.

Figure 10:
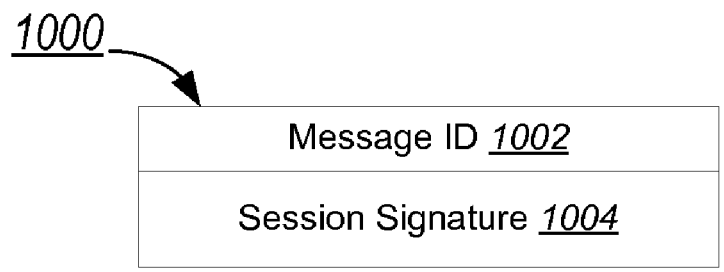
FIG. 10 illustrates an exemplary structure of a "session updated" message according to one embodiment of the invention.

Returning to FIG. 8, $AN_1$ $804_1$ issues another "configuration request" message (step 816). At this time, if $AN_1$ $804_1$ determines that negotiated personality should be stored as Personality $ID_y$, it would send a "session updated" message to SSP 806 (step 818). FIG. 10 illustrates an exemplary structure of a "session updated" message 1000 in accordance with one embodiment of the invention. In this embodiment, the sender would send the "session updated" message 1000 to indicate that the session has been updated. As shown in FIG. 10, the "session updated" message 1000 includes the following fields:

Message ID—The sender would set this Message ID field 1002 to a unique value to indicate that the message is a "session updated" message 1000. In one embodiment, the sender sets this field 1002 to 0x17.

Session Signature—The sender sets this field 1004 to the session signature corresponding to the updated session.

Continuing with FIG. 8, SSP 806 would respond to the "session updated" message (step 818) with a "session updated acknowledgement" message (step 820). Upon receiving the "session updated acknowledgement" message, $AN_1$ $804_1$ would issue a "configuration complete" message (step 822) to indicate that it has completed the negotiation procedures for the creation or re-configuration of a personality. FIG. 9D is an exemplary structure of a "configuration complete" message 930 in accordance with one embodiment of the invention. As shown in FIG. 9D, the "configuration complete" message 930 includes the following fields:

Message ID—The sender of the "configuration complete" message 930 could be AT or AN. Furthermore, the sender would set this Message ID field 932 to a unique value to indicate that the message is a "configuration complete" message and that the sender is either AT or AN. In one embodiment, AT would set the field 932 to the value of 0x0c, while AN would set the field 932 to the value of 0x0d.

Transaction ID—An access terminal (AT) would increment the value of this field 934 for each new "configuration complete" message sent. An access network (AN) would set this field 934 to the value of the Transaction ID field in the last "configuration complete" message received from the access terminal (AT).

Personality ID—This field 936 would only be set by an access network (AN) to indicate the personality ID of the bin where the negotiated personality should be stored.

Session Signature—This field 938 would only be set by an access network (AN) to indicate the signature of the updated session.

Continue—This field 939 would only be set by an access network (AN) to indicate whether additional personalities are to be negotiated.

Returning to FIG. 8, AT 802 sends a "session updated" message (step 824) to serving $AN_1$ $804_1$ to inform access networks in the active set that session has been updated. Serving $AN_1$ $804_1$ would forward (step 825) the "session updated" message to other access networks (including $AN_2$ $804_2$) in the active set. After serving $AN_1$ $804_1$ issues a "get session" message to SSP 806 (step 826), SSP 806 sends "get session acknowledgement" message to $AN_1$ $804_1$ in response (step 828). $AN_2$ $804_2$ would then issue a "get session" message to SSP 806 (step 830), and SSP 806 would respond by sending a "get session acknowledgement" message to $AN_2$ $804_2$ (step 832). At this time, the access networks (including $AN_1$ $804_1$ and $AN_2$ $804_2$) in the active set would have an updated session and would have recommitted their respective InUse personality.

III.E Session Change Control

As discussed above in section III.D, multiple ANs could attempt to re-configure the session at the same time since each AN in an active set has its own independent InUse personality. To resolve this problem, in one embodiment, an AT would support only a single instance of InConfiguration. In other words, an AT would only participate in the configuration process to change a session with one AN at a time.

When AN wishes to re-configure a session, AN would issue "configuration start" message to open up the session. However, AT would decide whether to accept or reject the configuration start. If AT accepts the configuration start, AN could proceed to re-configure the session. However, if AT rejects the configuration start, AN would not be able to proceed with re-configuration. As discussed in the preceding paragraph, in one embodiment, AT participates in one configuration process at a time. In this embodiment, AT would reject the "configuration start" message if AT is already participating in a configuration process.

When re-configuration is complete (i.e., when AN sends a "configuration complete" message), the session will be closed. In addition, the "session signature" is incremented to ensure the correct copy of the session is used. The access network (AN) manages the "session signature" and includes it in the "configuration complete" message used to complete the re-configuration of the session.

III.F Switching Personalities

Figure 12A:
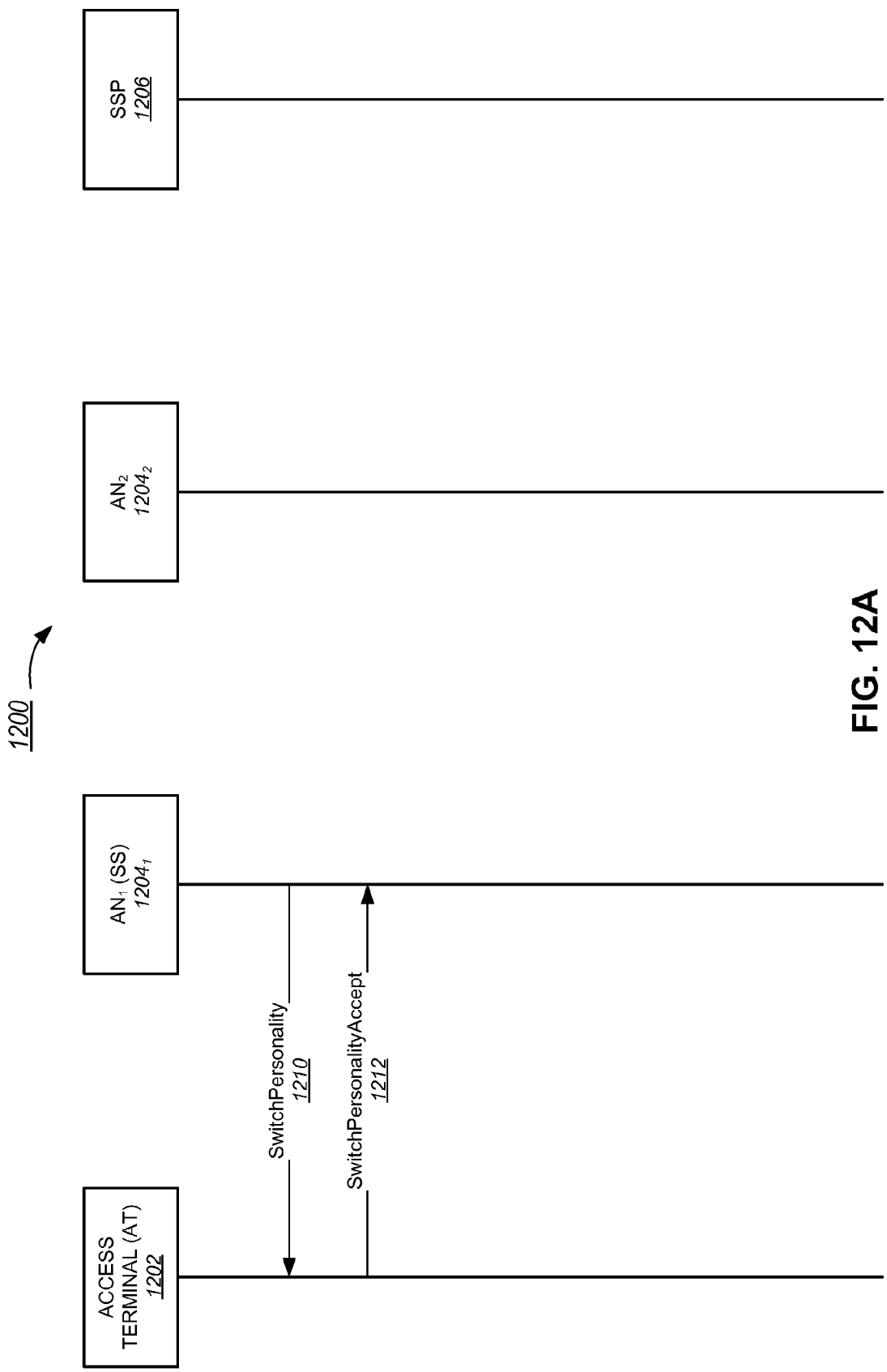
FIGS. 12A and 12B illustrate exemplary call flows to switch personalities according to one embodiment of the invention.
Figure 12B:
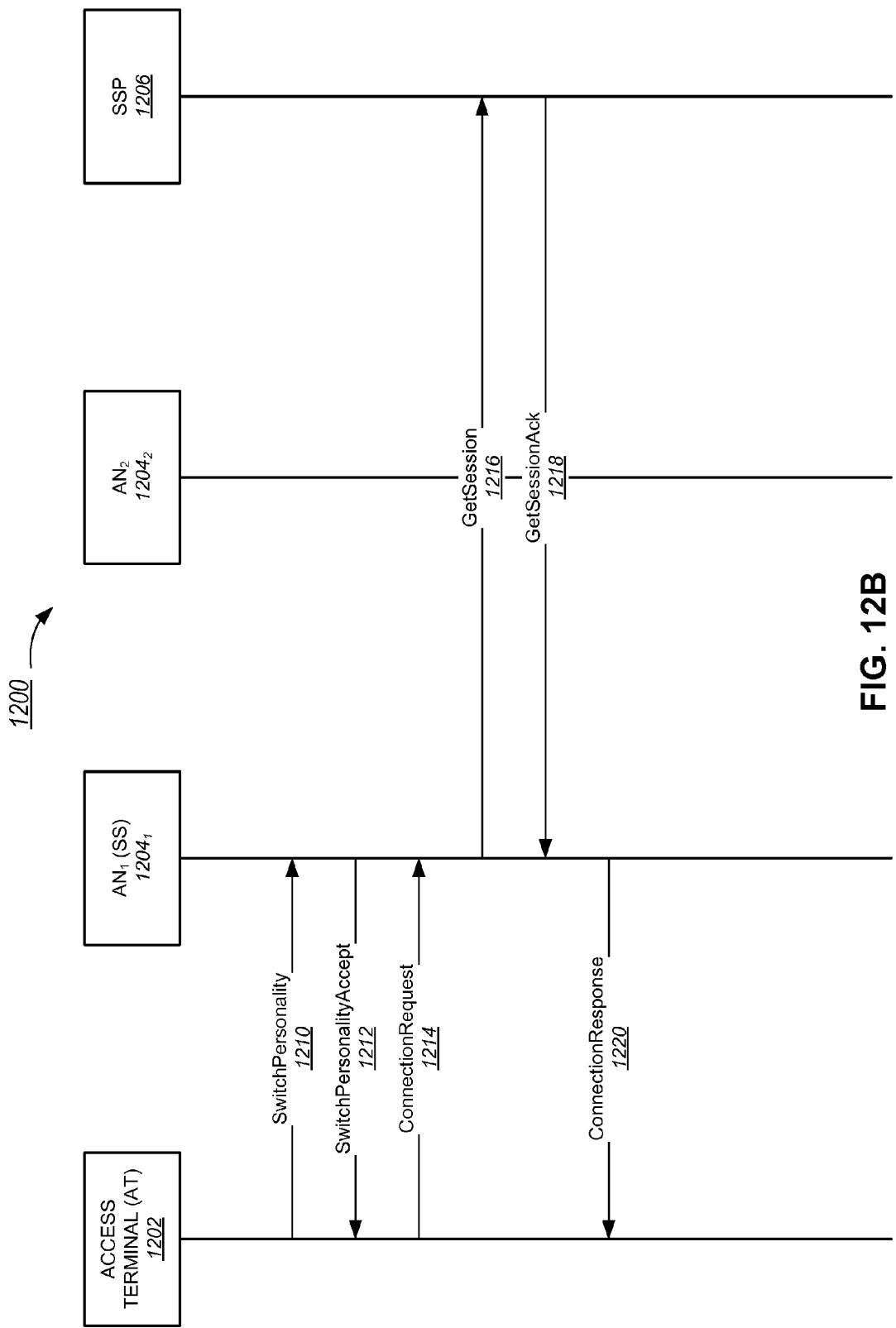

FIGS. 12A and 12B illustrate exemplary call flows 1200 to switch personalities. In particular, FIG. 12A shows the call flow for a "soft" personality switch that requires a soft-commit without closing the connection, and FIG. 12B shows the call flow with additional steps or actions to implement a "hard" personality switch that requires the closing of the connection for the switch to take effect.

In general, an access network (AN)—such as $AN_1$ $1204_1$ or $AN_2$ $1204_2$—can initiate the switch of its InUse personality to a new personality stored at SSP 1206. The new personality may already be the InUse personality of another AN. However, $AN$ $1204_1$ or $1204_2$ cannot switch to Personality ID of '0' since this personality is reserved for the IPSI-based stack. In response to a switch personality request, AT 1202 can reject the request. Furthermore, AT 1202 can suggest a personality request, but AN $1204_1$ or $1204_2$ would decide whether to accept this request.

Figure 13A:
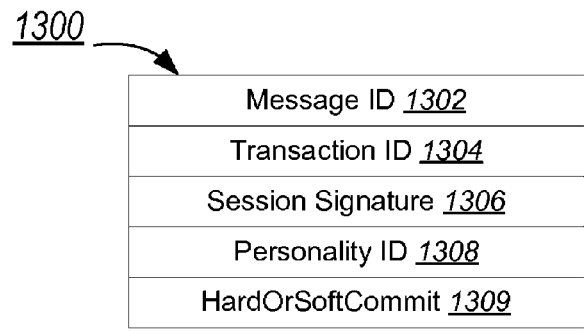
FIG. 13A shows an exemplary structure of a "switch personality" message according to one embodiment of the invention.

Turning now to FIG. 12A, $AN_1$ $1204_1$ sends a "switch personality" message (step 1210) to request a switch to an indicated personality. FIG. 13A shows an exemplary structure of a "switch personality" message 1300 in accordance with one embodiment of the invention. As shown in FIG. 13A, the "switch personality" message 1300 includes the following fields:

Message ID—The sender would set this Message ID field 1302 to a unique value to indicate that the message is a "switch personality" message 1300. In one embodiment, the sender sets this field 1302 to 0x13.

Transaction ID—The sender of the "switch personality" message 1300 increments this Transaction ID field 1304 for each new message 1300 sent.

Session Signature—The sender sets this field 1306 to the signature of the corresponding session.

Personality ID—This field 1308 is used to indicate the personality to switch to.

HardOrSoftCommit—This field 1309 indicates whether the connection needs to be closed for the personality switch to occur. In one embodiment, the field 1309 is set to '1' if the difference between the old personality and the new personality includes any hard-committable attributes.

Figure 13B:
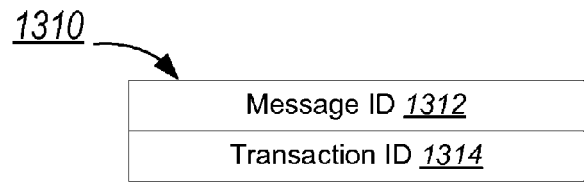
FIG. 13B is an exemplary structure of a "switch personality accept" message according to one embodiment of the invention.

Returning to FIG. 12A, AT 1202 responds to the "switch personality" message (step 1210) by sending a "switch personality accept" message (1212) to indicate that AT 1202 has accepted the request to switch personality. FIG. 13B is an exemplary structure of a "switch personality accept" message 1310 in accordance with one embodiment of the invention. As shown in FIG. 13B, the "switch personality accept" message 1310 includes the following fields:

Message ID—The sender would set this Message ID field 1312 to a unique value to indicate that the message is a "switch personality accept" message 1310. In one embodiment, the sender sets this field 1312 to 0x14.

Transaction ID—The sender of the "switch personality accept" message 1310 would set this Transaction ID field 1314 to the Transaction ID field 1304 of the corresponding "switch personality" message 1300.

Turning back to FIG. 12A, AT 1202 marks the indicated personality (personality Y) as the InUse personality of $AN_1$ $1204_1$. Furthermore, if $AN_1$ $1204_1$ had requested a "soft" switch, AT 1202 would delete the protocol stack corresponding to personality X, and creates a new protocol stack corresponding to personality Y.

However, if $AN_1$ $1204_1$ had requested a "hard" switch, AT 1202 would close and re-establish the connection with $AN_1$ $1204_1$ by sending a "connection request" message as shown in step 1214 of FIG. 12B. As shown in this figure, after receiving the "connection request" message of step 1214, $AN_1$ $1204_1$ issues a "get session" message (step 1216) to SSP 1206 in response. SSP 1206 would then send a "get session acknowledgement" message (step 1218) to $AN_1$ $1204_1$. After receiving the "get session acknowledgement" message of step 1218, $AN_1$ $1204_1$ sends a "connection response" message (step 1220) to AT 1202 to complete the hard-committable procedure required for the "hard" switch to take effect.

Figure 13C:
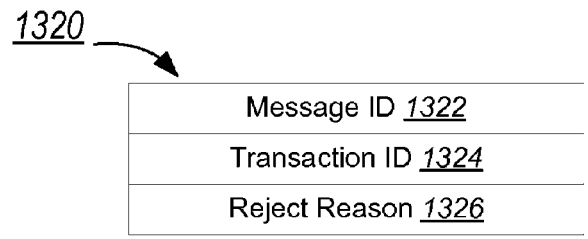
FIG. 13C illustrates an exemplary structure of a "switch personality reject" message according to one embodiment of the invention.

Furthermore, AT 1202 could issue a "switch personality reject" message (instead of the "switch personality accept" message in step 1212 of FIGS. 12A and 12B) to indicate that AT has rejected the request to switch personality. FIG. 13C illustrates an exemplary structure of a "switch personality reject" message 1320 in accordance with one embodiment of the invention. As shown in FIG. 13C, the "switch personality reject" message 1320 includes the following fields:

Message ID—The sender would set this Message ID field 1322 to a unique value to indicate that the message is a "switch personality reject" message 1320. In one embodiment, the sender sets this field 1322 to 0x15.

Transaction ID—The sender of the "switch personality reject" message 1320 would set this Transaction ID field 1324 to the Transaction ID field 1304 of the corresponding "switch personality" message 1300.

Reject Reason—The sender of the "switch personality reject" message 1320 sets this field to indicate the reason for rejecting the request to switch personality.

Figure 13D:
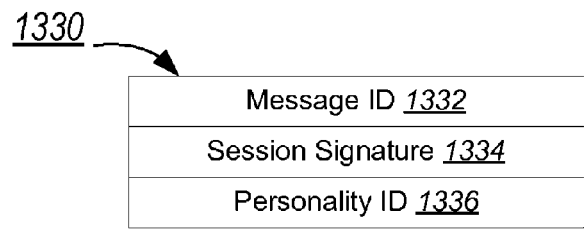
FIG. 13D shows an exemplary structure of a "switch personality request" message according to one embodiment of the invention.

As discussed above, AT 1202 can suggest a personality switch. To do so, AT 1202 would send a "switch personality request" message. FIG. 13D illustrates an exemplary structure of a "switch personality request" message 1330 in accordance with one embodiment of the invention. As shown in FIG. 13D, the "switch personality request" message 1330 includes the following fields:

- Message ID—The sender would set this Message ID field 1332 to a unique value to indicate that the message is a "switch personality request" message 1330. In one embodiment, the sender sets this field 1332 to 0x16.
- Session Signature—The sender of the "switch personality request" message 1330 would set this field 1334 to indicate the signature of the corresponding session.
- Personality ID—The sender of the "switch personality request" message 1330 sets this field to indicate the personality to switch to.

III.F Deleting Personalities

Figure 14:
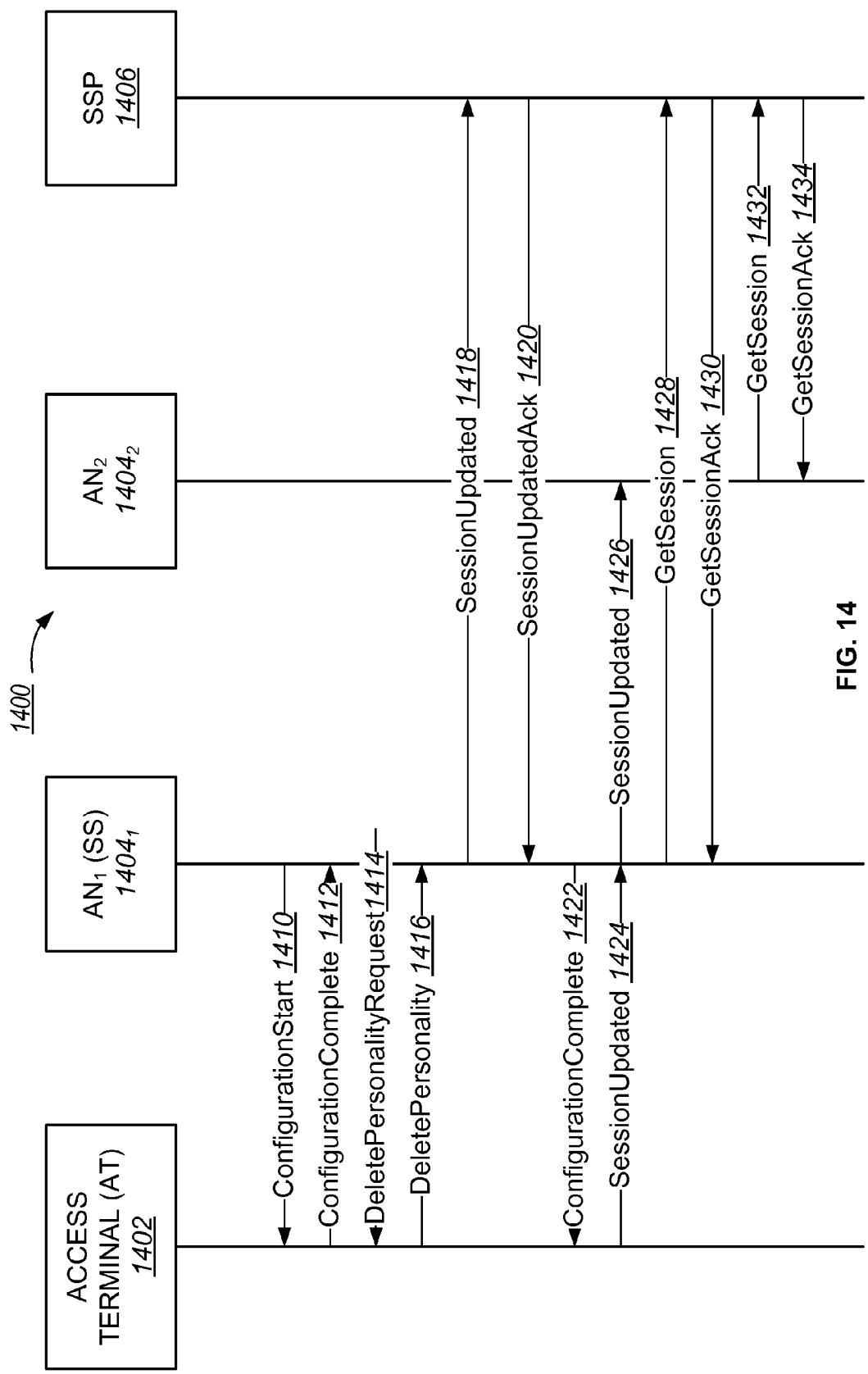
FIG. 14 is an exemplary call flow to delete a personality according to one embodiment of the invention.

FIG. 14 illustrates an exemplary call flow 1400 to delete a personality. In general, existing personalities may need to be deleted when new personalities are added because there is a finite number of personalities that could be stored. An access network (AN) can propose the personalities to be deleted by providing a list of personalities. In one embodiment, the list of personalities can be provided in the decreasing preference for deletion. AT would make the final decision on which personality to delete since AT would know which personalities are InUse.

Figure 15A:
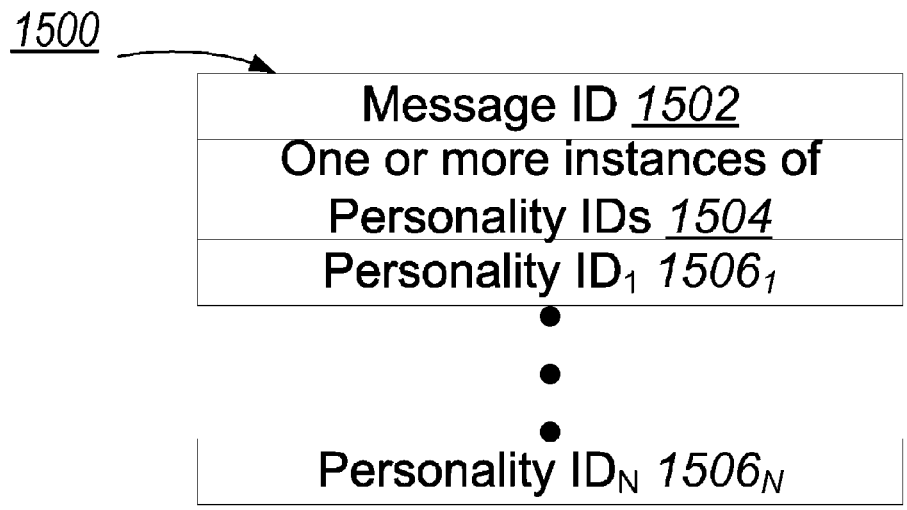
FIG. 15A shows an exemplary structure of a "delete personality request" message according to one embodiment of the invention.

As shown in FIG. 14, $AN_1$ 1204$_1$ sends a "delete personality request" message (step 1414) to request the deletion of one or more personalities (for example, personality Y and personality Z). FIG. 15A shows an exemplary structure of a "delete personality request" message 1500 in accordance with one embodiment of the invention. As shown in FIG. 15A, the "delete personality request" message 1500 includes the following fields:

- Message ID—The access network (AN) would set this Message ID field 1502 to a unique value to indicate that the message is a "delete personality request" message 1500. In one embodiment, the sender sets this field 1502 to 0x10.
- Zero or more instances of personalities—This field 1504 is used to indicate the number (zero or more) of personalities should be deleted.
- Personality IDs—The Personality IDs 1506$_1$ ... 1506$_N$ contain the personalities that the access network (AN) wishes to delete. The number of personalities is provided in the field 1504.

Figure 15B:
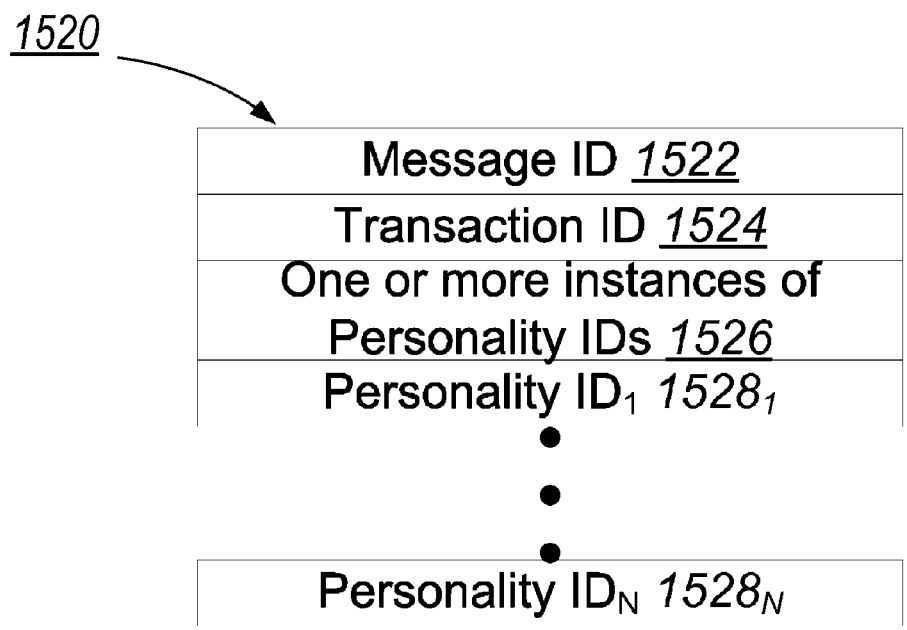
FIG. 15B is an exemplary structure of a "delete personality" message according to one embodiment of the invention.

Turning back to FIG. 14, AT 1402 could agree to delete one or more personalities that $AN_1$ 1204$_1$ had proposed for deletion. For example, if $AN_1$ 1204$_1$ proposed deletion of personality Y and personality Z and AT 1402 agrees to delete only personality Z, AT 1402 would send a "delete personality" message (step 1416) to delete the personality. FIG. 15B is an exemplary structure of a "delete personality" message 1520 in accordance with one embodiment of the invention. As shown in FIG. 15B, the "delete personality" message 1520 includes the following fields:

- Message ID—The access network (AN) would set this Message ID field 1522 to a unique value to indicate that the message is a "delete personality" message 1520.
- Transaction ID—The access network (AN) would increment the value of the Transaction ID field 1524 for each new "delete personality" message 1520 sent.
- Zero or more instances of personalities—This field 1526 is used to indicate the number (zero or more) of personalities should be deleted.
- Personality IDs—The Personality IDs 1528$_1$ ... 1528$_N$ contain the personalities to delete. The number of personalities is provided in the field 1524.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal (or UE). In the alternative, the processor and the storage medium may reside as discrete components in a user terminal (or UE).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for negotiating and managing one or more personalities in a wireless communications system, comprising:
   receiving an advertised one or more supported initial protocol set identifiers;
   selecting a starting initial protocol set identifier from the advertised initial protocol set identifiers;
   establishing a session based on the selected starting initial protocol set identifier; and
   establishing a connection between an access terminal and an access network based on the selected initial protocol set identifier.

2. The method of claim 1, further comprising: establishing a connection between the access terminal and the access network based on the selected initial protocol set identifier and a selected personality.

3. The method of claim 1, further comprising: issuing a request from the access network to create a new personality based on a selected initial protocol set identifier or an existing personality.

4. The method of claim 3, further comprising: accepting the new personality at the access terminal.

5. The method of claim 3, further comprising: rejecting the new personality and adopting a different personality.

6. The method of claim 3, further comprising: allowing the access terminal to decide, based on its capabilities, to reject the request to create the new personality.

7. The method of claim 3, further comprising:
   creating the new personality; and
   storing the new personality as an existing personality without closing the connection.

8. The method of claim 3, further comprising:
   creating the new personality; and
   storing the new personality as an existing personality by closing and re-establishing the connection.

9. The method of claim 1, further comprising: issuing a request from the access terminal to create a new personality.

10. The method of claim 1, further comprising: issuing a request from the access terminal to re-configure a personality.

11. The method of claim 10, wherein re-configuring a personality includes changing a static attribute in the personality resulting in changing that static attribute in all personalities.

12. The method of claim 10, wherein re-configuring a personality includes changing a dynamic attribute in the personality without causing any changes in other personalities.

13. The method of claim 1, further comprising: allowing the access network to create, re-configure, and switch personalities.

14. The method of claim 1, further comprising: performing a soft personality switch without closing the connection to apply the switch.

15. The method of claim 1, further comprising: performing a hard personality switch that requires closing the connection to apply the switch.

16. The method of claim 1, further comprising: receiving from the access network a request to switch personality.

17. The method of claim 16, further comprising: accepting the request to switch personality at an access terminal.

18. The method of claim 16, further comprising: rejecting the request to switch personality at an access terminal if it is not capable of supporting the personality.

19. The method of claim 1, further comprising: issuing from the access terminal a request to switch personality.

20. The method of claim 1, further comprising: proposing a list of one or more personalities to be deleted, and allowing the access terminal to decide which personality to delete.

21. The method of claim 20, further comprising:
   selecting one or more personalities from the list of one or more personalities to be deleted such that a personality less likely to be used would more likely be selected for deletion; and
   deleting the selected one or more personalities.

22. The method of claim 1, further comprising: allowing each access network in an active set to use a different personality to communicate with the access terminal.

23. The method of claim 22, further comprising: allowing the access terminal to determine and control a number of distinct personalities that the access terminal supports.

24. The method of claim 1, further comprising: storing personalities at a session storage point.

25. The method of claim 1, further comprising: selecting a personality that matches an advertised initial protocol set identifier.

26. The method of claim 1, further comprising: allowing the access terminal to add a new access network to an active set of the access terminal.

27. The method of claim 26, further comprising: allowing the access terminal to propose a personality (personality Y) to communicate with the new access network.

28. The method of claim 27, further comprising: accepting the proposed personality (personality Y) at the new access network.

29. The method of claim 27, further comprising: allowing the new access network to reject the proposed personality (personality Y) and to adopt a different personality (personality Z).

30. The method of claim 29, further comprising: deleting a communication protocol stack for the proposed personality (personality Y) and creating a communication protocol stack for the different personality (personality Z).

31. The method of claim 1, further comprising: allowing the access network to create a new personality using an in-use personality of the access network as a starting point.

32. The method of claim 1, further comprising:
allowing the access network to request to re-configure a personality; and
allowing the access terminal to participate in one configuration process at a time.

33. The method of claim 32, further comprising: allowing the access terminal to reject the request if the access terminal is already participating in another configuration process.

34. An access terminal adapted to negotiate and manage one or more personalities in a wireless communications system, the access terminal comprising:
a receiver configured to receive an advertised one or more supported initial protocol set identifiers; and
a processor configured to select a starting initial protocol set identifier from the advertised initial protocol set identifiers, establish a session based on the selected starting initial protocol set identifier, and establish a connection between the access terminal and an access network based on the selected initial protocol set identifier.

35. The access terminal of claim 34, wherein the processor is further configured to establish a connection between the access terminal and the access network based on the selected initial protocol set identifier and a selected personality.

36. The access terminal of claim 34, wherein the receiver is further configured to receive a request issued from the access network to create a new personality based on a selected initial protocol set identifier or an existing personality.

37. The access terminal of claim 36, wherein the processor is further configured to accept the new personality.

38. The access terminal of claim 36, wherein the processor is further configured to reject the new personality, and to adopt a different personality.

39. The access terminal of claim 36, wherein the processor is further configured to decide, based on its capabilities, whether to reject the request to create the new personality.

40. The access terminal of claim 34, wherein the processor is further configured to issue a request to create a new personality.

41. The access terminal of claim 34, wherein the processor is further configured to issue a request from the access terminal to re-configure a personality.

42. The access terminal of claim 41, wherein the processor is further configured to re-configure a personality by changing a static attribute in the personality resulting in changing that static attribute in all personalities.

43. The access terminal of claim 41, wherein the processor is further configured to re-configure a personality by changing a dynamic attribute in the personality without causing any changes in other personalities.

44. The access terminal of claim 34, wherein the personalities are created, re-configured, and switched by the access network.

45. The access terminal of claim 34, wherein a personality switch is requested by the access network.

46. The access terminal of claim 45, wherein the processor is further configured to accept the request to switch personality.

47. The access terminal of claim 45, wherein the processor is further configured to reject the request to switch personality if the access terminal is not capable of supporting the personality.

48. The access terminal of claim 34, wherein the processor is further configured to issue a request to switch personality.

49. The access terminal of claim 34, wherein a list of one or more personalities to be deleted is proposed by the access network, and the processor is further configured to decide which personality to delete.

50. The access terminal of claim 34, wherein a different personality is used by each access network in an active set to communicate with the access terminal.

51. The access terminal of claim 50, wherein the processor is further configured to determine and control a number of distinct personalities that the access terminal supports.

52. The access terminal of claim 34, wherein the personalities are stored in a session storage point.

53. The access terminal of claim 34, wherein the processor is further configured to add a new access network to an active set of the access terminal.

54. The access terminal of claim 53, wherein the processor is further configured to propose a personality (personality Y) to communicate with the new access network.

55. The access terminal of claim 54, wherein the processor is further configured to accept the proposed personality (personality Y) at the new access network.

56. The access terminal of claim 54, wherein the proposed personality (personality Y) is rejected, and a different personality (personality Z) is adopted by the new access network.

57. The access terminal of claim 56, wherein the processor is further configured to delete a communication protocol stack for the proposed personality (personality Y), and create a communication protocol stack for the different personality (personality Z).

58. The access terminal of claim 34, wherein a new personality is created by the access network using an in-use personality of the access network as a starting point.

59. The access terminal of claim 34, wherein a personality is requested to be re-configured by the access network, and the processor is further configured to participate in one configuration process at a time.

60. The access terminal of claim 59, wherein the processor is further configured to reject the request if the access terminal is already participating in another configuration process.

* * * * *